(12) United States Patent
Ferro et al.

(10) Patent No.: US 12,111,148 B2
(45) Date of Patent: Oct. 8, 2024

(54) COMPONENT IMAGING SYSTEMS, APPARATUS, AND METHODS

(71) Applicant: General Electric Company, Schenectady, NY (US)

(72) Inventors: Andrew Frank Ferro, West Chester, OH (US); Peter Coomes, Middletown, OH (US)

(73) Assignee: General Electric Company, Evendale, OH (US)

( * ) Notice: Subject to any disclaimer, the term of this patent is extended or adjusted under 35 U.S.C. 154(b) by 578 days.

(21) Appl. No.: 17/326,778

(22) Filed: May 21, 2021

(65) Prior Publication Data

US 2022/0373325 A1    Nov. 24, 2022

(51) Int. Cl.
| | | |
|---|---|---|
| G01B 15/04 | (2006.01) | |
| G01M 13/00 | (2019.01) | |
| G01M 15/14 | (2006.01) | |

(52) U.S. Cl.
CPC ............. *G01B 15/04* (2013.01); *G01M 13/00* (2013.01); *G01M 15/14* (2013.01)

(58) Field of Classification Search
CPC ...... G01M 15/14; G01M 13/00; G01N 23/04; G01N 29/226; G01N 29/11; G01N 29/069; G01N 29/0645; G01N 29/0609; G01N 23/046; G01N 9/24; G01N 2001/2893; G01N 2223/3306; G01N 2223/419; G01N 2223/633; G01N 2223/402; G01N 2223/646; G01N 2223/63; G01B 15/04; G06T 7/0004; G06T 2207/30164; G06T 2207/10081; G06T 11/005; G06T 11/008; G06T 7/001; G06T 2207/10072;
(Continued)

(56) References Cited

U.S. PATENT DOCUMENTS

| | | | | |
|---|---|---|---|---|
| 5,335,260 A | * | 8/1994 | Arnold ................. | A61B 6/583 378/207 |
| 6,637,936 B2 | | 10/2003 | Crain et al. | |

(Continued)

FOREIGN PATENT DOCUMENTS

| | | |
|---|---|---|
| EP | 090509 A1 | 3/1999 |
| EP | 2988151 A2 | 2/2016 |

(Continued)

*Primary Examiner* — Irakli Kiknadze
(74) *Attorney, Agent, or Firm* — McGarry Bair PC

(57) ABSTRACT

A system for imaging a component defining a negative space is provided comprising a component imaging assembly, a bolus insert, and an imaging device. The bolus insert is positionable in the component's negative space when the component is positioned within an imaging device imaging field to produce a component image. A method is provided comprising positioning a bolus insert within a component's negative space and scanning the component having the bolus insert to create an image of the component. A component imaging assembly is provided comprising a component including a first portion having a first thickness that is greater than a second thickness of a second portion; and a bolus insert positioned adjacent the second portion that has a bolus thickness substantially similar to a difference between the first and second thicknesses. The bolus insert has a bolus material density within fifteen percent (15%) of a component material density.

19 Claims, 4 Drawing Sheets

(58) Field of Classification Search
CPC ......... B28B 1/008; F01D 5/147; F01D 5/282;
F01D 5/284; F01D 9/023; F01D 9/041;
F05D 2240/35; F05D 2250/291; F05D
2250/37; F05D 2250/38; F05D 2230/314;
F05D 2300/6033; F05D 2300/6034; Y02T
50/60; A61B 6/583; A61B 6/505; A61B
6/482
USPC .......................................... 378/4, 19, 57, 62
See application file for complete search history.

(56) References Cited

U.S. PATENT DOCUMENTS

| | | |
|---|---|---|
| 7,272,208 B2 | 9/2007 | Yatsenko et al. |
| 8,755,865 B2 | 6/2014 | Gonzalez Molezzi et al. |
| 9,909,999 B2 * | 3/2018 | Karlen ................ G01N 23/18 |
| 9,927,805 B2 | 3/2018 | Ju |
| 10,082,596 B2 | 9/2018 | Hu et al. |
| 10,083,520 B2 | 9/2018 | Kim et al. |
| 10,350,435 B2 | 7/2019 | Robar et al. |
| 10,773,336 B2 | 9/2020 | Harding et al. |
| 2013/0003917 A1 | 1/2013 | Kim et al. |
| 2018/0126670 A1 | 5/2018 | DehghanNiri et al. |
| 2019/0242001 A1 * | 8/2019 | Bernard .................... F01D 9/04 |
| 2020/0217807 A1 | 7/2020 | Safai |

FOREIGN PATENT DOCUMENTS

| | | |
|---|---|---|
| JP | H11108859 A | 4/1999 |
| JP | 2017150485 A | 8/2017 |
| JP | 2018076478 A | 5/2018 |
| JP | 2019155600 A | 9/2019 |
| JP | WO2017158965 A1 | 11/2021 |
| KR | 20210004178 A | 1/2021 |
| WO | 2011/132820 A1 | 10/2011 |

* cited by examiner

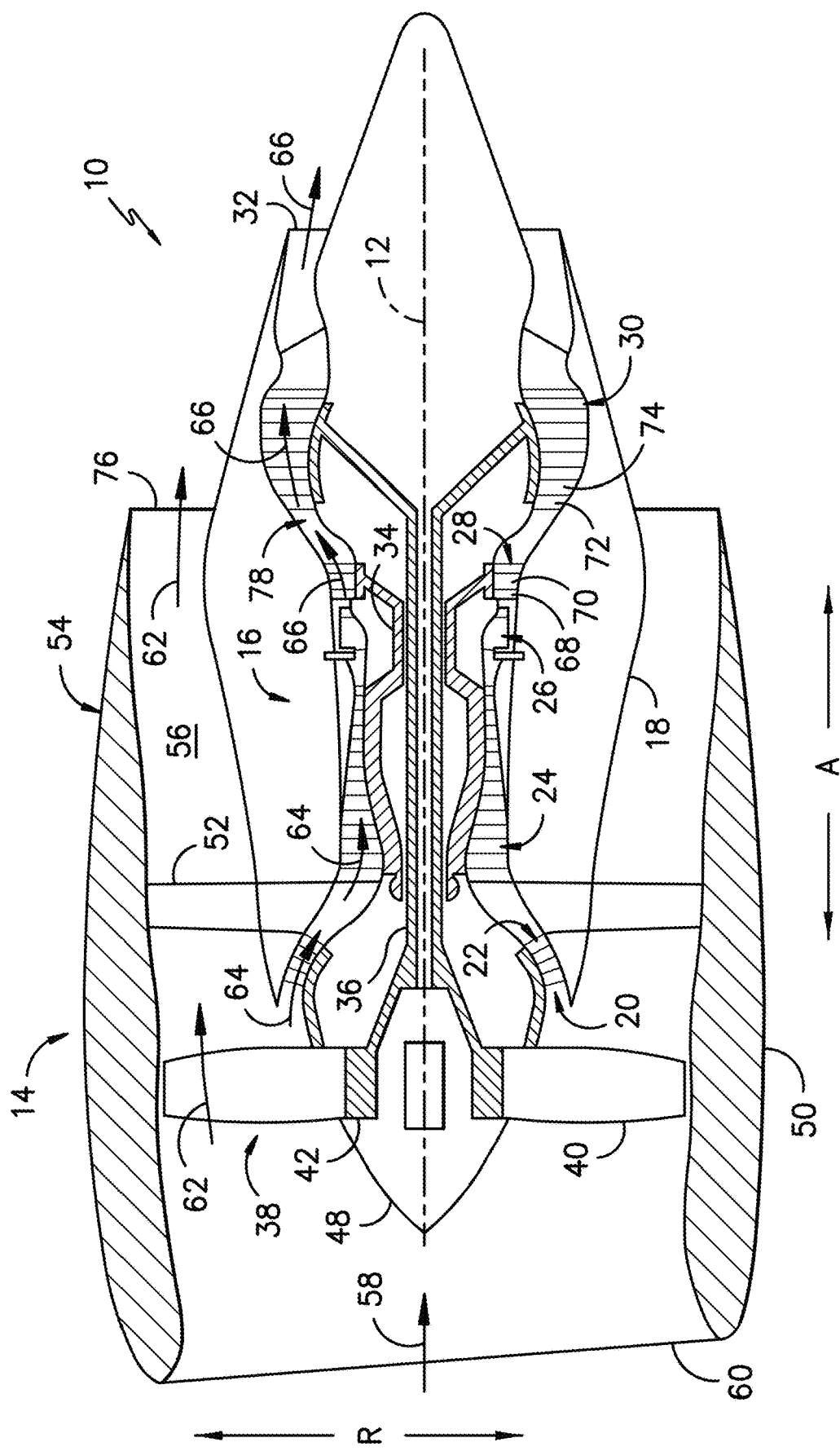
FIG. -1-

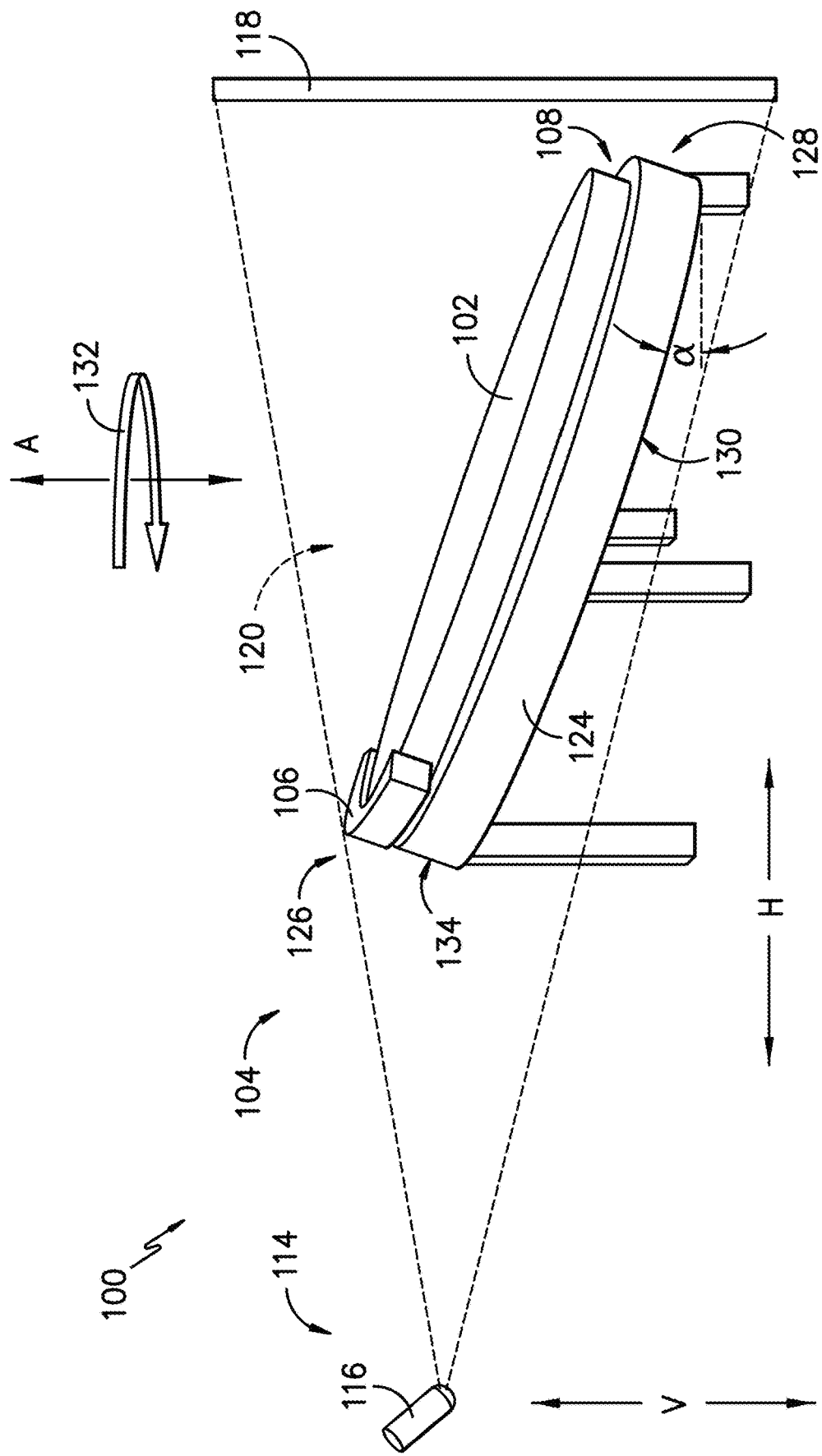
FIG. -2-

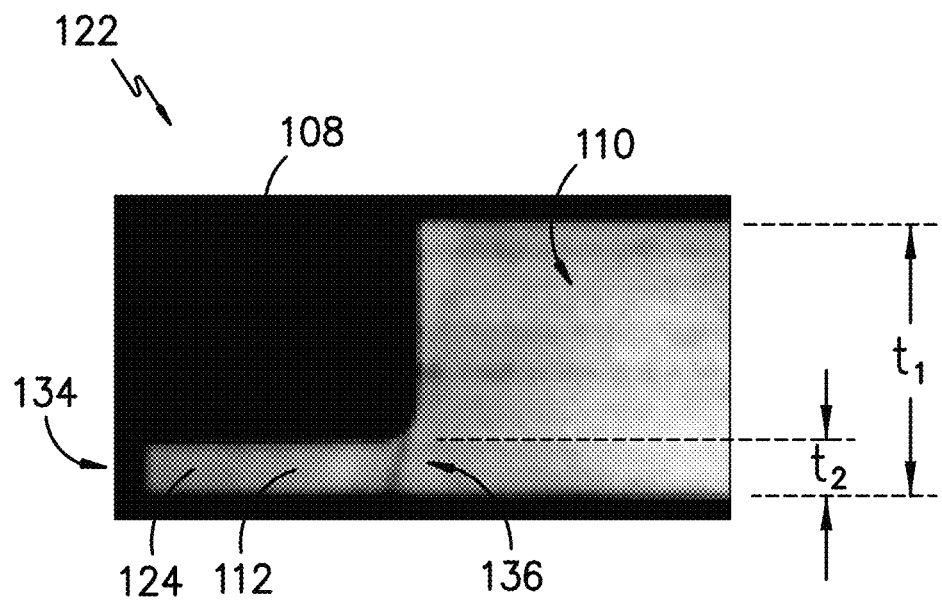
FIG. -3-
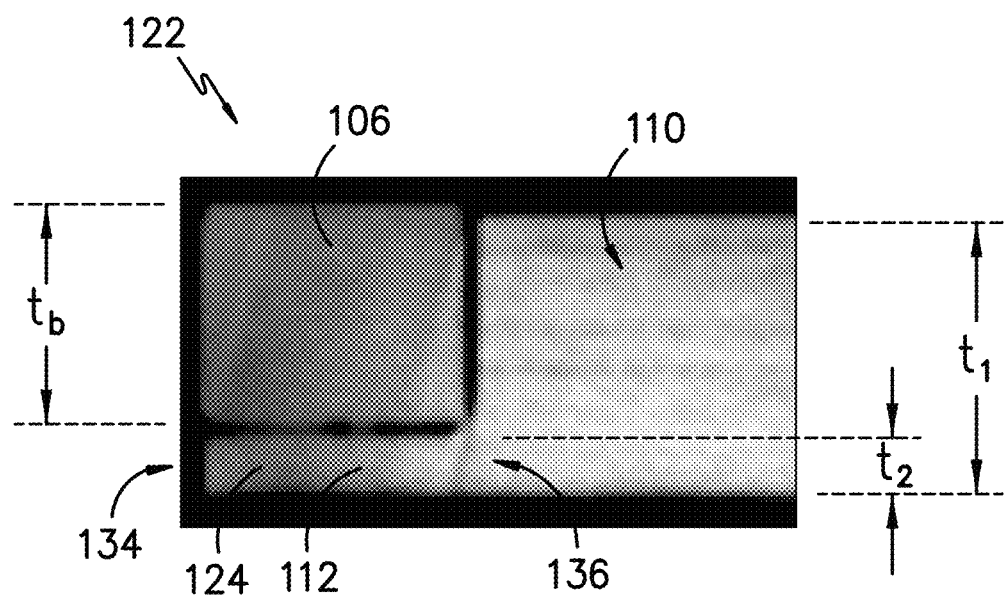
FIG. -4-

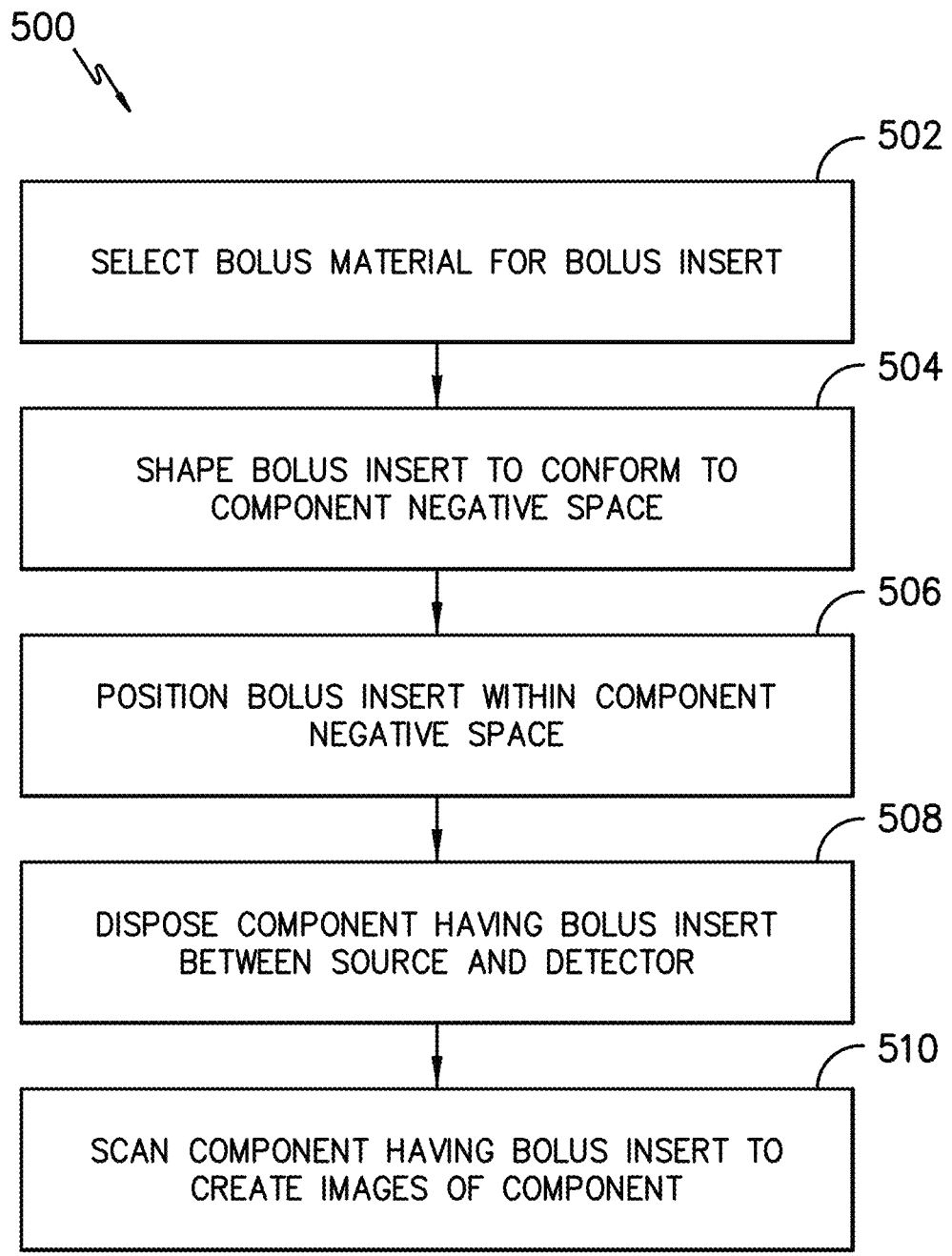
FIG. -5-

COMPONENT IMAGING SYSTEMS, APPARATUS, AND METHODS

FEDERALLY SPONSORED RESEARCH

This invention was made with government support under contract number W58RGZ-19-C-0003 awarded by the Department of the Army. The U.S. government may have certain rights in the invention.

FIELD

The present subject matter relates generally to component imaging and, more particularly, to internal imaging of components using image scans.

BACKGROUND

Internal imaging or radiographic testing of components, e.g., gas turbine engine components such as airfoils, shrouds, etc., results in scans whose image data represents the relative density of the material. Variations in material density shown in a component scan can aid the identification of defects, measurement of internal passageways or cavities, or the like. Certain geometrical features of a component may cause artifacts in the image data that make it appear there are different densities in the component that do not exist in reality, which can lead to a mistaken conclusion that the component includes one or more defects or can inaccurately indicate the size and/or location of an internal component feature. For radiographic imaging, the artifacts can be caused by scatter, beam hardening, and/or partial volume effect within the x-ray beam and its interaction with the component. Accordingly, improved imaging apparatus and methods that reduce the effect of image artifacts would be desirable.

BRIEF DESCRIPTION

Aspects and advantages of the present disclosure will be set forth in part in the following description, or may be obvious from the description, or may be learned through practice of the presently disclosed subject matter.

In one embodiment of the present subject matter, a system for imaging a component is providing. The component defines a negative space, and the system comprises a component imaging assembly; a bolus insert; and an imaging device. The bolus insert is positionable in the negative space of the component when the component is positioned within an imaging field of the imaging device to produce an image of the component.

In another embodiment of the present subject matter, a method is provided. The method comprises positioning a bolus insert within a negative space defined by a component and scanning the component having the bolus insert to create an image of the component.

In a further embodiment of the present subject matter, a component imaging assembly is provided. The component imaging assembly comprises a component including a first portion having a first thickness and a second portion having a second thickness. The first thickness is greater than the second thickness. The component imaging assembly further comprises a bolus insert positioned adjacent the second portion. The bolus insert has a bolus thickness that is substantially similar to a difference between the first thickness and the second thickness. The bolus insert has a bolus material density within fifteen percent (15%) of a component material density of the component.

These and other features, aspects and advantages of the present disclosure will become better understood with reference to the following description and appended claims. The accompanying drawings, which are incorporated in and constitute a part of this specification, illustrate embodiments of the presently disclosed subject matter and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 provides a schematic cross-section view of a gas turbine engine according to various embodiments of the present subject matter.

FIG. 2 provides a schematic view of a system including a component, such as a component of the gas turbine engine of FIG. 1, and a component imaging assembly, according to an embodiment of the present subject matter.

FIG. 3 provides an image of the component taken without a bolus insert.

FIG. 4 provides an image of the component taken with a bolus insert, according to an embodiment of the present subject matter.

FIG. 5 provides a flow diagram illustrating a method for producing component images, according to an embodiment of the present subject matter.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides systems and methods for improving component imaging. For example, a system as described herein comprises a component imaging assembly including a component defining a negative space and a bolus insert positioned in the negative space. The system further comprises an imaging device, and the component is positioned within an imaging field of the imaging device to produce an image of the component. The bolus insert, which may be shaped to at least partly complement the negative space to normalize or even out the component geometry and may have a density approximating the component density, helps reduce or eliminate image artifacts caused by scatter, beam hardening, and/or partial volume effect, e.g., by normalizing the distances of the beam path for all views or all captured projections. Further, the systems and methods described herein can produce image data with consistent signal-to-noise ratio, contras, and resolution despite an irregular component geometry.

Referring now to the drawings, wherein identical numerals indicate the same elements throughout the figures, FIG. 1 is a schematic cross-sectional view of a gas turbine engine in accordance with an embodiment of the present disclosure. For the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The depicted core turbine engine 16 generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis (illustrated as longitudinal centerline 12) by LP shaft or spool 36. In some embodiments, a power gear box having a plurality of gears may be included for stepping down the rotational speed of the LP shaft or spool 36 to a more efficient rotational fan speed.

Referring still to the embodiment of FIG. 1, disk 42 is covered by rotatable front nacelle 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan engine 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Turning to FIG. 2, a system 100 is illustrated, according to various embodiments of the present subject matter. As described herein, the system 100 is used for imaging a component 102, e.g., a component of the turbofan engine 10 such as a fan blade 40, a turbine stator vane 68, 72, a turbine rotor blade 70, 74, a turbine shroud, etc. The system comprises a component imaging assembly 104 for imaging the component 102 using a bolus insert 106. More particularly, the component 102 defines a negative space 108, such as a groove, lip, flange, passage, or the like such that at least one portion of the component 102 is thinner than another portion of the component 102. That is, a first portion 110 has a first thickness $t_1$ (FIGS. 3, 4) and a second portion 112 has a second, different thickness $t_2$ (FIGS. 3, 4), with the first thickness $t_1$ being greater than the second thickness $t_2$ or the second thickness $t_2$ being less than the first thickness $t_1$. The bolus insert 106 is positioned in the negative space 108 to increase the thickness of the second portion 112 such that the component imaging assembly 104 essentially has a uniform thickness across the cross-section. In at least some embodiments, the bolus insert 106 has a bolus thickness $t_b$ (FIG. 4) that is substantially similar to the difference between the second thickness $t_2$ and the first thickness $t_1$ such that the bolus insert 106 substantially fills in the negative space 108, increasing the thickness of the second portion 112 to be essentially equal to the thickness of the first portion 110.

Although FIGS. 2 through 4 depict a component 102 with only two component thicknesses $t_1$ and $t_2$ defining the negative space 108, it will be appreciated that the present disclosure is also applicable to components 102 having a negative space 108 defined by more than two thicknesses. For example, the negative space 108 may be defined by a curved surface or the like, where the thickness of the component 102 is changing from one point to another along a length such that the component 102 and the bolus insert 106 positioned adjacent to the component surface each have multiple or a plurality of thicknesses. It will be understood, however, for any two component thicknesses $t_1$, $t_2$ of a plurality of component thicknesses adjacent which the bolus insert 106 is positioned, the bolus insert 106 has a thickness $t_b$ that may be substantially similar to the difference between the two component thicknesses $t_1$ $t_2$ such that the bolus insert 106 substantially fills the negative space 108 defined by the component surface between those points along the component surface having the first thickness $t_1$ and the second thickness $t_2$.

The system 100 also comprises an imaging device 114. For example, the imaging device 114 is a radiographic image device, such as a digital radiography (DR) machine, a film radiography machine, a computed tomography (CT) scanner, or the like. In some embodiments, the radiographic imaging device 114 comprises a radiography source 116 and a radiography receiver 118, such as a detector or film. The component 102 is positioned within an imaging field 120 of the imaging device 114 to produce an image 122 (FIGS. 3, 4) of the component 102. The image 122 depicts the interior of the component 102, which can help in measurement at or near internal features, such as internal passageways, cavities, or the like, and/or can help in the identification of defects in the component material, such as cracks, fissures, unintentional holes or apertures, and/or other types of weak spots in the component material.

The bolus insert 106 disposed in the negative space 108 helps reduce or eliminate image artifacts that could falsely indicate the presence of an opening, fissure, gap, aperture, etc. in the material forming the component 102. More particularly, certain geometrical features of the component 102, such as the flange 124 defined around the edge of the ring-shaped component 102 shown in FIG. 2, can cause artifacts in the image data that make it appear there are different densities in the component 102 (which density differentials generally indicate an opening, fissure, etc., in the component 102, such as a defect) but the different densities do not actually exist. The flange 124 defines a negative space 108, and the bolus insert 106 positioned in the negative space 108 reduces or eliminates the effect of the negative space 108 by "evening out" the component geometry or increasing the thickness of the component 102 in the region of the flange 124 such that the component 102 appears to the imaging device 114 to have a uniform geometry and thickness. The uniformity in component geometry and thickness thereby mitigates image artifacts, which may be understood to be drops or changes in signal from the imaging device (e.g., a drop in CT signal where the imaging device 114 is a CT scanner) that can be confused with openings, gaps, fissures, etc. in the component material.

Accordingly, the bolus insert 106 has a shape or geometry at least partly complementary to the negative space 108, as well as a density approximate to the density of the component 102. The negative space 108 has a geometry that may be referred to as the space geometry, which is defined by the component 102. The bolus insert 106 has a bolus geometry that is at least partly complementary to the space geometry. In at least certain embodiments, the bolus geometry of the bolus insert 106 is such that the bolus insert 106 fits closely against the component 102 within the negative space 108, e.g., to closely approximate where the component material would be absent the negative space 108. For instance, as shown in FIG. 2, the flange 124 of the component 102 may be annular or ring-shaped such that the negative space 108 is annular or ring-shaped. In such embodiments, the bolus insert 106 has a complementary annular or ring shape such that the bolus insert 106 fills the negative space 108, e.g., such that, to the imaging device 114, the negative space 108 does not appear to exist. The bolus insert 106 may be dimensioned and shaped to minimize or eliminate gaps between the bolus insert 106 and the component 102. Therefore, for the depicted embodiment, the bolus insert 106 is shaped and sized to minimize or eliminate the negative space 108 defined by the flange 124. It will be appreciated that the bolus insert 106 may be shaped to conform to a particular negative space 108 and, thus, one or more bolus inserts 106 may be manufactured for a single component 102 and/or a variety of bolus inserts 106 may be manufactured for a variety of components 102, e.g., with a respective bolus insert 106 matching the geometry of a respective negative space 108. Further, it will be appreciated that the bolus insert 106 need not be shaped only with respect to the component 102 and negative space 108. For instance, the bolus insert 106 may be shaped to complement the beam path, e.g., from the radiography source 116 to optimize the beam path through the component 102.

Moreover, the component 102 is formed from a component material having a component material density. Likewise, the bolus insert 106 is formed from a bolus material having a bolus material density. To maximize the benefits of the bolus insert 106, the bolus material density should be as close to the component material density as possible, i.e., the bolus material should be within a density tolerance of the component material. For example, in some embodiments the bolus material density is within fifteen percent (15%) of the component material density, i.e., the bolus material density is ±15% of the component material density. More particularly, the bolus material density is within ten percent (10%) of the component material density, i.e., the bolus material density is ±10% of the component material density. Still further, the bolus material density is within five percent (5%) of the component material density, i.e., the bolus material density is ±5% of the component material density. Having a bolus density substantially close or equal to the component density helps equalize the path lengths (e.g., for DR imaging) or projections (for CT imaging) to improve image quality, e.g., by reducing image artifacts. It will be appreciated that, like the geometry of the bolus insert 106, the bolus material and bolus material density may be matched to a particular component 102 and its component material density, such that the bolus material density may vary between bolus inserts 106, e.g., if the component material and its component material density varies between components 102 in which the bolus inserts 106 are used.

As shown in FIG. 2, the component 102 is angled with respect to the radiography source 116 and the radiography receiver 118 (e.g., a detector or film). In the embodiment of FIG. 2, the component 102 is angled upward with respect to the radiography source 116 such that a proximal end 126 of the component 102 closest to the radiography source 116 is at an elevated height compared to a distal end 128 of the component 102 closest to the radiography receiver 118. In other embodiments, the component 102 may be angled downward or otherwise with respect to the radiography source 116. The illustrated component 102 is at an angle α with respect to a horizontal direction H, i.e., the angle α is measured from the horizontal direction H to a surface 130 of the component 102 facing the horizontal direction H. It will be appreciated that the horizontal direction H is orthogonal to a vertical direction V.

The angle α of the component 102 with respect to the radiography source 116 and/or radiography receiver 118 may be optimized based on, e.g., the configuration or design of the bolus insert 106 to ensure optimal image quality. More specifically, given the configuration of the bolus insert 106, the angle α of the component 102 may be chosen to minimize image noise, as well as scatter, beam hardening, and/or partial volume effect that could otherwise result from the interaction between the beam from the radiography source 116 and the component 102. In some embodiments, the angle α may be within a range of about 0° to about 90° with respect to the horizontal direction H. As described herein, the bolus insert 106 has a shape that thickens a thinner area of the component 102 to remove the spatial non-stationarity of relevant image metrics, taking into account the angle α at which the component 102 with the bolus insert 106 sits relative to the radiography source 116 and radiography receiver 118 of the scanner or imaging device 114.

Moreover, the component 102 may be rotated about an axis A extending along the vertical direction V, as indicated by the arrow 132 denoting a direction of rotation, to vary the position of the component 102 for successive images. That is, the position of the component 102 may be changed between images captured by the imaging device 114 such that, e.g., the proximal end 126 of the component 102 is different from one position to another and different portions of the component 102 are at a different location with respect to the radiography source 116. The component 102 may be rotated to produce a complete, 360° image of the component 102. Further, it will be appreciated that the component 102 may be rotated manually or automatically, e.g., the component 102 may be supported such that one or more operators manually reposition the component 102 between image captures or the component 102 may be supported such that an automated machine repositions the component 102 between image captures. As described herein, the bolus insert 106 may extend within the entire negative space 108 or may extend within only a portion of the negative space 108. In embodiments where the bolus insert 106 extends within only a portion of the negative space 108, the bolus insert 106 may be repositioned as the component 102 is repositioned or rotated such that the bolus insert 106 is always located in the negative space 108 at or near the proximal end 126 of the component 102 to help mitigate or eliminate data artifacts which might otherwise be caused by the negative space 108.

As previously described, in some embodiments such as the embodiment illustrated in FIG. 2, the component 102 is annular or ring-shaped and is formed from a component material. For example, the component 102 may be a ring shroud of the turbofan engine 10 formed from a ceramic matrix composite (CMC) material. In various embodiments, CMC materials may include silicon carbide (SiC), silicon, silica, carbon, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As previously mentioned, the bolus insert 106 is shaped complementary to the negative space 108 defined by the component 102. In the embodiment depicted in FIG. 2, the negative space 108 is ring-shaped, extending about a radially outer edge 134 of the component 102. Thus, in some embodiments, the bolus insert 106 may be a ring of bolus material that extends about the entire radially outer edge 134, i.e., about the circumference of the component 102 commensurate with the negative space 108 illustrated in FIG. 2. In other embodiments, the bolus insert 106 may be an arc of bolus material, i.e., a partial ring of the bolus material that extends about a portion of the radially outer edge 134 of the component 102 as shown in FIG. 2 such that the bolus insert 106 does not fill all of the negative space 108 (is not commensurate with the negative space 108). More specifically, the arc-shaped bolus insert 106 extends over arc that has an angular length such that the arc extends over less than the full 360° of the annular negative space 108.

Further, as previously described, the bolus insert 106 is formed from a bolus material similar in density to the component material from which the component 102 is formed. In embodiments in which the component material is a CMC material, the bolus material may be, e.g., aluminum, which has a density approximating or equivalent to the density of a typical CMC material. Accordingly, in at least some embodiments as shown in FIG. 2, the bolus insert 106 may be an arc-shaped insert formed from aluminum. As further illustrated in the embodiment of FIG. 2, when positioned between the radiography source 116 and radiography receiver 118, the proximal end 126 of the component 102, with the arc-shaped bolus insert 106 positioned thereon, is at an angle α of about 30° with respect to the horizontal direction H. Additionally, as described above, the component 102 may be repositioned between image captures, with the arc-shaped bolus insert 106 moved as the component 102 is rotated about the vertical direction V such that the bolus insert 106 is always positioned at the proximal end 126 of the component 102.

Referring now to FIGS. 3 and 4, the effects of an aluminum bolus insert 106 in imaging a CMC ring shroud component 102 as described herein can be ascertained through comparison of two images 122 of the CMC ring shroud taken using CT imaging. FIG. 3 provides an image 122 of the CMC ring shroud component 102 without a bolus insert 106, and FIG. 4 provides an image 122 of the CMC ring shroud component 102 with a bolus insert 106. Specifically comparing the areas indicated by the arrow 136 in each image, it will be appreciated that the CT image captured with the bolus insert 106 significantly reduces an image artifact in the area of the flange 124 that defines the negative space 108. That is, in the area of the negative space 108, where the thickness of the component 102 (i.e., the thickness of the flange 124) is less than in the remainder of the component 102, an image artifact is present in the image of FIG. 3 (without the bolus insert 106) but is almost non-existent in the image of FIG. 4 (with the bolus insert 106). Thus, it can be seen that the bolus insert 106 helps reduce, and in some cases may entirely remove, image artifacts caused by scatter, beam hardening, and/or partial volume effect. As previously described, the reduction of image artifacts can improve component inspection for detection and/or metrology, e.g., by preventing false identification of component defects, improving measurement of component features, etc.

It will be appreciated that the ring shroud component 102 formed from a CMC material and the arc-shaped bolus insert 106 formed from aluminum are provided only by way of example. That is, the component 102 may be any component, device, or object formed from essentially any material and having a negative space 108 that is not limited to ring shapes. As a few examples, the component 102 may be a metal compressor or turbine blade of the turbofan engine 10, or the component 102 may be a non-metallic object not part of, used with, or otherwise related to a gas turbine engine, e.g., the component 102 may be an automotive component, a component of a household appliance, a medical device or implant, etc. to name just a few examples. As described herein, the bolus insert 106 has a geometry at least partly complementary to a negative space of the component 102 and, thus, is not limited to arc or ring shapes. Further, the bolus insert 106 has a density substantially similar to the density of the component 102 and, therefore, may be any suitable material having a substantially similar density (e.g., a metallic material, a non-metallic material, etc.). Of course, factors such as cost, availability, machinability, etc. also may be considered in the selection of the bolus material, as long as the density of the selected bolus material is substantially similar to the density of the component material.

Turning now to FIG. 5, a flow diagram of a method is provided, according to an embodiment of the present disclosure. The depicted method 500 includes selecting (502) a bolus material for a bolus insert 106 to be positioned within a component 102 formed from a component material. The bolus material has a bolus density within a density tolerance of the component material, such as within about 5%, 10%, or 15% of the density of the component material such that the bolus density is substantially close or equivalent to the component density. The method 500 also includes shaping (504) a bolus insert 106 to conform to a negative space 108 defined by a component 102. As described herein, shaping the bolus insert 106 may comprise forming, machining, or otherwise shaping the bolus material to have a shape complementary to the shape of the negative space 108. The method 500 also includes positioning (506) the bolus insert 106 within the negative space 108 of the component 102 and disposing (508) the component 102 having the bolus insert 106 between a radiography source 116 and a radiography receiver 118. As described herein, the imaging device 114 comprising the radiography source 116 and radiography receiver 118 may be a digital radiography (DR) device, a film radiography device, a computed tomography (CT) device, or the like, and the component 102 having the bolus insert 106 may be angled with respect to the radiography source 116 and radiography receiver 118 as described herein.

Referring still to FIG. 5, the method 500 further includes scanning (510) the component 102 having the bolus insert 106 to create an image of the component 102. An example of such an image is provided in FIG. 4, which shows a cross-section of a ring shroud component 102 with a bolus insert 106 positioned adjacent a flange 124 to equalize the thickness of the component 102 in the region of the flange 124 with the thickness of the remainder of the component 102. In some embodiments, scanning the component 102 comprises directing an x-ray beam from the radiography source 116 at the component 102 having the bolus insert 106. In other embodiments, a different imaging device 114 utilizing a different imaging technique may be used.

Accordingly, as described herein, the present subject matter provides a system and technique to reduce the effect of image artifacts in component imaging or component scans. More particularly, a bolus or bolus insert is used to even out and reduce the effects of variations in component geometry or thickness. A bolus insert can be provided for a wide variety of components formed from any material having an irregular geometry. Because the bolus insert is manufactured to have the same or similar density to the component, the imaging source (e.g., x-rays) interact similarly with both the bolus insert and the component. More importantly, because the bolus insert is manufactured to fit against the surface of the component and the bolus insert thickness is optimized such that, for instance, the combined x-ray path lengths through the component and bolus are normalized, artifacts occurring as a consequence of the geometry of the component are reduced. Additionally, image quality metrics that are otherwise spatially nonstationary, such as contrast, noise, and resolution in thick areas compared to thin areas of the component, are also normalized, resulting in more intuitive radiographic data. Thus, the component data that is acquired can be evaluated more easily by a human operator or computer assisted evaluation software.

The use of a bolus insert can improve inspection for defect detection or metrology, which can lead to improved component quality, e.g., through accurate identification of component defects. As described herein, a bolus insert for component imaging can improve evaluation of images, requiring less interrogation and judgment from an operator evaluating the images, as well as improve gage repeatability and reproducibility. Further, a bolus insert in a component can improve scan time because the component does not need extra scans to mitigate image artifacts. Thus, a bolus insert can improve cycle time and inspection cost. Moreover, utilizing a bolus insert with a component in component imaging can improve porosity detection and/or discrete indication detection. Additionally or alternatively, a bolus insert can enable advanced diagnostic radiology, as well as CT/DR internal metrology.

Therefore, by placing an optimally manufactured bolus insert on a component, the interaction of an imaging source (e.g., an x-ray beam) with the irregular geometry of the component can be optimized, and the effect of image artifacts can be removed, thereby enabling an improved inspection for component defect detection, measurement, and evaluation. More particularly, with a bolus insert on the component, a consistent signal is captured on the imaging receiver or detector (e.g., an x-ray detector). The consistent signal results in image data that more closely approximates the relative density of the component material being imaged. Image artifacts caused by scatter, beam hardening, and/or partial volume effect can be reduced or eliminated with this technique. Further, this technique can produce image data with consistent signal-to-noise ratio, contras, and resolution within an irregular component geometry that would otherwise present these issues and make interpretation of the data difficult. Other advantages of the subject matter described herein also may be realized by those of ordinary skill in the art.

Further aspects of the present disclosure are provided by the subject matter of the following clauses:

1. A system for imaging a component defining a negative space, the system comprising a component imaging assembly; a bolus insert; and an imaging device, wherein the bolus insert is positionable in the negative space of the component when the component is positioned within an imaging field of the imaging device to produce an image of the component.

2. The system of any preceding clause, wherein the negative space has a space geometry, and wherein the bolus insert has a bolus geometry that is at least partly complementary to the space geometry.

3. The system of any preceding clause, wherein the component is formed from a component material having a component material density, wherein the bolus insert is formed from a bolus material having a bolus material density, and wherein the bolus material density is within fifteen percent (15%) of the component material density.

4. The system of any preceding clause, wherein the bolus material density is within ten percent (10%) of the component material density.

5. The system of any preceding clause, wherein the imaging device is a radiographic image device.

6. The system of any preceding clause, wherein the radiographic image device comprises a radiography source and a radiography receiver.

7. The system of any preceding clause, wherein the component is angled with respect to the radiography source.

8. The system of any preceding clause, wherein the component is positioned at an angle α with respect to a horizontal direction orthogonal to a vertical direction.

9. The system of any preceding clause, wherein the component is rotatable about an axis extending along the vertical direction to reposition the component within the imaging field.

10. The system of any preceding clause, wherein the component has a first thickness in a first portion and a second thickness in a second portion adjacent the negative space, the second thickness less than the first thickness, and wherein the bolus insert has a bolus thickness to fill a difference between the second thickness and the first thickness in the negative space.

11. The system of any preceding clause, wherein the component is a ring shroud of a gas turbine engine, the ring shroud having a flange extending about a radially outer edge and defining the negative space, and wherein the negative space is annular.

12. The system of any preceding clause, wherein the bolus insert is arc-shaped.

13. The system of any preceding clause, wherein the component comprises a ceramic matrix composite (CMC) material.

14. The system of any preceding clause, wherein the bolus insert is formed from aluminum.

15. A method, comprising positioning a bolus insert within a negative space defined by a component; and scanning the component having the bolus insert to create an image of the component.

16. The method of any preceding clause, further comprising disposing the component having the bolus insert between a radiography source and a radiography receiver.

17. The method of any preceding clause, wherein scanning the component comprises directing an x-ray beam at the component from the radiography source.

18. The method of any preceding clause, further comprising shaping the bolus insert to conform to the negative space of the component.

19. The method of any preceding clause, further comprising selecting a bolus material for the bolus insert.

20. The method of any preceding clause, wherein the bolus material has a bolus material density that is within fifteen percent (15%) of a component material density of a component material forming the component.

21. The method of any preceding clause, wherein scanning the component comprises utilizing a digital radiography imaging device to image the component.

22. The method of any preceding clause, wherein scanning the component comprises utilizing a film radiography imaging device to image the component.

23. The method of any preceding clause, wherein scanning the component comprises utilizing a computed tomography imaging device to image the component.

24. A component imaging assembly, comprising a component including a first portion having a first thickness and a second portion having a second thickness, the first thickness being greater than the second thickness; and a bolus insert positioned adjacent the second portion, the bolus insert having a bolus thickness that is substantially similar to a difference between the first thickness and the second thickness, wherein the bolus insert has a bolus material density within fifteen percent (15%) of a component material density of the component.

This written description uses examples to disclose the preferred embodiments, including the best mode, and also to enable any person skilled in the art to practice the present subject matter, including making and using any devices or systems and performing any incorporated methods. The patentable scope of the presently disclosed subject matter is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system for imaging a component defining a negative space, the system comprising:

a component imaging assembly;
a bolus insert; and
an imaging device,
  wherein the bolus insert is positionable in the negative space of the component when the component is positioned within an imaging field of the imaging device to produce an image of the component, wherein the negative space has a space geometry, and wherein the bolus insert has a bolus geometry that is at least partly complementary to the space geometry; and
  wherein the component is formed from a component material having a component material density, wherein the bolus insert is formed from a bolus material having a bolus material density, and wherein the bolus material density is within fifteen percent (15%) of the component material density.

2. The system of claim 1, wherein the bolus material density is within ten percent (10%) of the component material density.

3. The system of claim 1, wherein the imaging device is a radiographic image device.

4. The system of claim 3, wherein the radiographic image device comprises a radiography source and a radiography receiver.

5. The system of claim 4, wherein the component is angled with respect to the radiography source.

6. The system of claim 1, wherein the component is positioned at an angle α with respect to a horizontal direction orthogonal to a vertical direction.

7. The system of claim 6, wherein the component is rotatable about an axis extending along the vertical direction to reposition the component within the imaging field.

8. The system of claim 1, wherein the component has a first thickness in a first portion and a second thickness in a second portion adjacent the negative space, the second thickness less than the first thickness, and wherein the bolus insert has a bolus thickness to fill a difference between the second thickness and the first thickness in the negative space.

9. The system of claim 1, wherein the component is a ring shroud of a gas turbine engine, the ring shroud having a flange extending about a radially outer edge and defining the negative space, and wherein the negative space is annular.

10. The system of claim 9, wherein the bolus insert is arc-shaped.

11. The system of claim 1, wherein the component comprises a ceramic matrix composite (CMC) material.

12. The system of claim 1, wherein the bolus insert is formed from aluminum.

13. The system of claim 1, wherein the bolus insert is positionable within a portion of the negative space, the portion being less than an entirety of the negative space.

14. A method, comprising:
  positioning a bolus insert within a negative space defined by a component wherein the negative space has a space geometry, and wherein the bolus insert has a bolus geometry that is at least partly complementary to the space geometry, wherein the component is formed from a component material having a component material density, wherein the bolus insert is formed from a bolus material having a bolus material density, and wherein the bolus material density is within fifteen percent (15%) of the component material density; and
  scanning the component having the bolus insert to create an image of the component.

15. The method of claim 14, further comprising:
  disposing the component having the bolus insert between a radiography source and a radiography receiver.

16. The method of claim 15, wherein scanning the component comprises directing an x-ray beam at the component from the radiography source.

17. The method of claim 14, further comprising:
  shaping the bolus insert to at least partially conform to the negative space of the component.

18. A system for imaging a component the component having a changing thickness defining a negative space, the system comprising:
a component imaging assembly;
a bolus insert; and
an imaging device,
  wherein the bolus insert is positionable in the negative space of the component and wherein the bolus insert is sized to provide an appearance of an even thickness of the component to the imaging device when the component and bolus insert are positioned within an imaging field of the imaging device to produce an image of the component; and
  wherein the component is formed from a component material having a component material density, wherein the bolus insert is formed from a bolus material having a bolus material density, and wherein the bolus material density is within fifteen percent (15%) of the component material density.

19. The system of claim 18, wherein the component comprises a ceramic matrix composite (CMC) material or the bolus insert is formed from aluminum.

* * * * *